United States Patent [19]

Mookherjee et al.

[11] 3,728,358
[45] Apr. 17, 1973

[54] PROCESS FOR THE PREPARATION OF MACROCYCLIC LACTONES

[75] Inventors: Braja D. Mookherjee, Matawan; William I. Taylor, Summit, both of N.J.

[73] Assignee: International Flavors & Fragrances Inc., New York, N.Y.

[22] Filed: June 25, 1971

[21] Appl. No.: 156,955

Related U.S. Application Data

[63] Continuation of Ser. No. 18,701, Mar. 11, 1970, abandoned.

[52] U.S. Cl. .................................. 260/343, 252/522
[51] Int. Cl. ............................................... C07d 9/00
[58] Field of Search ....................................... 260/343

[56] References Cited

UNITED STATES PATENTS

| 2,417,151 | 3/1947 | Collaud | 260/343 |
| 2,936,310 | 5/1960 | Beets et al. | 260/343 X |
| 3,584,067 | 6/1971 | Story | 260/343 |

*Primary Examiner*—John M. Ford
*Attorney*—Lorimer P. Brooks et al.

[57] ABSTRACT

Macrocyclic ketones are converted into the corresponding lactones with a peracid in the presence of a boron trifluoride etherate catalyst and an inert solvent to form a reaction mixture. This mixture is heated until the conversion is complete and the desired lactones can be recovered by conventional means. The novel lactone obtained, 1-hydroxy-9-cyclohexadecanolide, is useful as a fragrance ingredient.

4 Claims, No Drawings

PROCESS FOR THE PREPARATION OF MACROCYCLIC LACTONES

This application is a continuation of application Ser. No. 18,701, filed Mar. 11, 1970, now abandoned.

BACKGROUND OF THE INVENTION

This invention relates to a process for the preparation of macrocyclic lactones. More specifically, the present invention comprises a process whereby macrocyclic ketones are treated with a peracid and converted into the corresponding macrocyclic lactones in a reaction wherein boron trifluoride etherate is used as a catalyst.

The macrocyclic lactones produced by the process of the present invention possess a most desirable type of musk odor and, therefore, have attracted much attention. The odor of musk is perhaps the most universally appreciated fragrance and is usually thought of as the animal note in perfumes.

A number of routes for the production of these macrocyclic lactones from various starting materials are available, but they are rather slow and cumbersome. None of these processes utilize a peracid and boron trifluoride etherate to produce the macrocyclic lactones. Peracetic acid has been used to convert cyclic ketones to the corresponding cyclic lactones, however, the cyclic compounds have been only small-membered rings, see Starcher and Phillips, *Am. Soc.*, 80, 4079 (1958). McClure and Williams [J. Org. Chem. 27, page 24 (1961)] disclose the use of a hydrogen peroxide-boron trifluoride etherate oxidizing agent for converting simple aliphatic ketones to the corresponding esters, however, this is not applicable to the conversion of macrocyclic ketones to the corresponding macrocyclic lactones.

It is, therefore, an object of the present invention to provide a process for the preparation of macrocyclic lactones.

It is a further object of this invention to provide a process for converting macrocyclic ketones with a peracid in the presence of a boron trifluoride etherate catalyst into the corresponding macrocyclic lactones.

Other objects of the present invention will be set forth in, or be apparent from, the following detailed description of the invention.

THE INVENTION

These objects are achieved by the process of the present invention wherein the starting material is a macrocyclic ketone of the general formula:

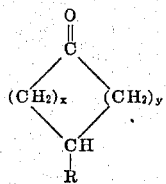

wherein R is a substituent such as hydrogen, hydroxyl, acetoxy, and the like, and the sum of $x$ and $y$ is an integer from 10 to 16.

The peracids useful in the present invention include peracetic acid, perbenzoic acid, perpropionic acid, perphthalic acid and other similar peracids. The present conversion of macrocyclic ketones to the corresponding macrocyclic lactones with a peracid is effected with a boron trifluoride etherate catalyst in the presence of an inert solvent. The reaction is carried out by heating the reaction mixture comprised of the macrocyclic ketone, the suitable peracid, the boron trifluoride etherate catalyst and the inert solvent to a temperature of from about 40°C. to about 70°C. Preferably, the reaction is carried out at a temperature of about 45°C. to about 55°C. The reaction can be carried out during a period of about 10 hours to about 16 hours until the reaction is complete. In general, reaction times of about 12 hours are preferred. The reaction is normally carried out at atmospheric pressure; however, should a reaction appear to be sluggish, higher pressures can be used in order to raise the temperature and allow the reaction to proceed.

The general reaction of the present invention is illustrated by the equation below:

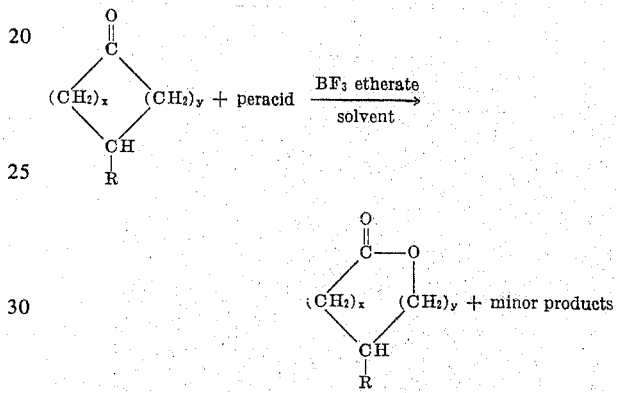

The principal product is the macrocyclic lactone corresponding to the macrocyclic ketone starting material. The macrocyclic lactone product can be recovered by conventional means from the reaction mixture of the above general equation. These lactones have a highly desirable and useful odor characterized as a musk odor. They can be utilized as a component of perfume compositions to promote a musk fragrance. Perfume compositions containing from about 1.0 percent to about 50.0 percent by weight based on the active fragrance ingredients before dilution are desirable and useful. These macrocyclic lactones can also be utilized as intermediates in the synthesis of other macrocyclic compounds.

As stated above, boron trifluoride etherate is utilized as a catalyst in the present invention. Although boron trifluoride etherate can be classified as a "Lewis acid," i.e., a substance which can accept a lone pair of electrons from another substance to complete the election ring system of one of its own atoms, other similar Lewis acid compounds such as aluminum chloride, stannous chloride and zinc chloride have been found not to be useful in the process of this invention. The boron trifluoride etherate is used in catalytic amounts.

As stated above, the macrocyclic ketone, the peracid and the boron trifluoride etherate catalyst are combined in the presence of an inert solvent. Suitable inert solvents include chloroform, ether, methylene chloride and the like. Chloroform is a preferred solvent.

As stated heretofore, the macrocyclic ketone is treated with a peracid such as peracetic acid, perpropionic acid, perbenzoic acid, perphthalic acid and other similar peracids in the presence of the catalyst to form the corresponding macrocyclic lactone. The peracid is utilized in excess and preferably in a molar ratio of peracid to macrocyclic ketone of from about 3:1 to about 6:1, preferably about 4:1. If a ratio of less than about 3:1 peracid to macrocyclic ketone is used, then poor yields of macrocyclic lactone will result, and if a ratio of greater than 6:1 is utilized, then polymerization problems may result.

The following examples will illustrate in detail the manner in which the invention may be practiced. It will be understood, however, that the invention is not confined to the specific limitations set forth in the individual examples, but rather to the scope of the appended claims.

EXAMPLE I

Preparation of cyclohexadecanolide from cyclohexadecanone

An apparatus consisting of a 100 ml. reaction flask equipped with an addition funnel, magnetic stirrer, thermometer and reflux condenser fitted with drying tube is charged with 2.15 g. (0.009 mole) of cyclohexadecanone and 18 ml. of chloroform. 0.45 ml. of freshly distilled 98 percent boron trifluoride etherate is then added over a period of 5 minutes and the temperature rises from 25° to 29°C. and the solution assumes an orange color. 5.13 g. (0.027 mole) of 40 percent peracetic acid is then added over a period of 15 minutes and the temperature rises to 33°C. and the solution becomes pale yellow. The temperature is then raised to 45°C. and the contents are stirred for 11½ hours. The solution is then cooled and 20 ml. of water are added and the organic layer is then extracted twice with 50 ml. portions of hexane, washed three times with 50 ml. portions of a saturated sodium chloride solution and dried over anhydrous sodium sulfate. The solvent is then removed in vacuo yielding 2.65 g. of crude material which is then chromatographed to obtain 0.963 g. of cyclohexadecanolide.

EXAMPLE II

Preparation of 1-hydroxy-9-cyclohexadecanolide from 1-hydroxy-9-cyclohexadecanone An apparatus consisting of a 100 ml. reaction flask fitted with an addition funnel, mechanical stirrer, thermometer, reflux condenser, heating mantle and thermo watch is charged with 2.0 g. (0.0078 mole) of 1-hydroxy-9-cyclohexadecanone, 40 ml. of chloroform and 6.0 g. of boron trifluoride etherate and the mixture is stirred. Over a fifteen minute period, 5.0 g. (0.028 mole) of 40 percent peracetic acid are added and the resulting reaction mixture is then stirred for 12 hours at 50°C. ± 5°C. The chloroform layer is then washed three times with 20 ml. portions of a 50 percent sodium chloride solution and twice with cold water until neutral and then dried over sodium sulfate yielding 2.0 g. of crude material. This crude material is then chromatographed to obtain 0.35 g. (30 percent yield) of 1-hydroxy-9-cyclohexadecanolide.

When the procedures set forth in Examples I and II are duplicated using stannous chloride, aluminum chloride and zinc chloride in place of boron trifluoride etherate as the catalyst, no significant yields of lactone are obtained.

EXAMPLE III

A perfume composition is prepared by admixing the following ingredients in the indicated proportions:

| Ingredient | Parts |
|---|---|
| Geranium, Algerian | 100 |
| Clove | 100 |
| Cassia | 30 |
| Labdanum resin | 60 |
| Castoreum absolute | 10 |
| Sandal | 50 |
| Cedarwood | 150 |
| Ionone residues | 30 |
| Vetivert | 20 |
| Benzyl benzoate | 150 |
| Terpineol | 150 |
| Cyclohexadecanolide from Example I | 150 |
| | 1000 |

This perfume composition is found to have a desirable musk fragrance quality.

EXAMPLE IV

A total of 100 g. of soap chips is mixed with 1 g. of the perfume composition prepared in Example III until a substantially homogeneous composition is obtained. This homogeneous composition is then pressed into a bar having a desirable musk scent.

What is claimed is:

1. The process for the preparation of macrocyclic lactones by conversion of a macrocyclic ketone having the general formula

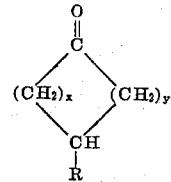

wherein R is a substituent selected from the group consisting of hydrogen, hydroxyl and acetoxy and the sum of $x$ and $y$ is an integer from 10 to 16, which process comprises the successive steps of: (a) combining said macrocyclic ketone with a peracid and a boron trifluoride etherate catalyst in the presence of an inert solvent to form a reaction mixture and (b) heating said reaction mixture to effect the conversion reaction.

2. The process of claim 1, wherein the peracid is used in a molar ratio of peracid to macrocyclic ketone of from about 3:1 to about 6:1.

3. The process of claim 1, wherein the temperature of step (b) is from about 40°C. to about 70°C.

4. 1-hydroxy-9-cyclohexadecanolide.

* * * * *